United States Patent Office 3,255,263
Patented June 7, 1966

3,255,263
NITROOLEFINS PREPARED FROM PRIMARY NITROHYDROCARBONS AND ALDEHYDES
Richard L. Abbott, Terre Haute, Ind., assignor to Commercial Solvents Corporation, New York, N.Y., a corporation of Maryland
No Drawing. Filed Feb. 23, 1965, Ser. No. 434,697
18 Claims. (Cl. 260—644)

This invention generally relates to a process for the production of nitroolefins. In a particular aspect the invention relates to an improved process for the production of nitroolefins wherein the nitro group is positioned on the carbon atom adjacent to the point of unsaturation by the reaction of a gaseous mixture of an aldehyde and a primary nitrohydrocarbon in the presence of alumina. In a further aspect the invention relates to an improved process for the production of the above class of nitroolefins by the reaction of a gaseous mixture of an aldehyde and a primary nitrohydrocarbon in the presence of niobium oxide and alumina.

It has long been known that nitroolefins can be prepared by dehydration of the corresponding nitroalcohol. More recently it has been proposed to produce nitroolefins by reacting a gaseous mixture of formaldehyde and a primary nitrohydrocarbon in the presence of magnesium sulfate. While the production of nitroolefins was accomplished by this procedure low yields of nitroolefins were obtained.

It is an object of the present invention to provide a process for the production of nitroolefins.

Further objects and advantages of the invention will be apparent from the remaining specification and the appended claims.

A first embodiment of this invention is directed to a process whereby nitroolefins can be produced by the reaction of a gaseous mixture of an aldehyde and a primary nitrohydrocarbon in the presence of catalytic amounts of alumina.

In a second and preferred embodiment of the present invention the reaction of the gaseous mixture is conducted in the presence of alumina and niobium oxide. It has been found that the use of niobium oxide and alumina as catalyst for the reaction provides higher yields of nitroolefins than are obtained when alumina alone is used to catalyze the reaction. Further it has ben found that the catalyst life of the niobium oxide-alumina combination is longer than that of alumina alone.

The nitrohydrocarbon employed in the process of the invention are converted by the reaction with the aldehyde to the nitroolefin. The nitrohydrocarbon used in the process should be a primary nitrohydrocarbon, that is to say, a nitrohydrocarbon wherein the nitro group is attached to a carbon atom bonded to at least two hydrogen atoms. Suitable nitrohydrocarbons are those which are readily vaporized at temperatures below which substantial decomposition of the particular nitrohydrocarbon occurs. Typically suitable nitrohydrocarbons are represented by the formula R—CH₂—NO₂ wherein R is an arylalkyl radical, an alkyl radical containing from one and up to and including twelve carbon atoms, hydrogen or an aryl radical. The nitrohydrocarbon may be substituted by substituents which do not affect the basic reaction between the aldehyde and the —CH₂—NO₂ group of the nitrohydrocarbon. Representative nitrohydrocarbons which may be employed include 1-nitropropane, para methyl phenyl nitromethane, nitroethane, 1-nitrobutane, phenyl nitroethane, phenyl nitromethane, 1-nitrodecane, nitromethane, phenyl nitropropane, 1-nitroheptane, and the like. It is preferred to use nitroalkanes having from two to four carbon atoms inclusive because they are readily available and give good results in the process. 1-nitropropane is particularly preferred.

The aldehydes used in the process should be those which are also readily vaporized at temperatures below which substantial decomposition of the particular aldehyde occurs. Typically suitable aldehydes are represented by the formula

wherein R' is an aryl radical, hydrogen, an arylalkyl radical or a lower alkyl radical, that is an alkyl radical containing from one up to about seven carbon atoms. Representative aldehydes include formaldehyde, propionaldehyde, acetaldehyde, and benzaldehyde. Because it is low in cost and gives good results formaldehyde is preferred. The aldehyde used in the invention can be the anhydrous form or it can be in the form of a solution such as an aqueous solution.

The present invention in its first embodiment is characterized by the catalytic action of alumina ($Al_2O_3$). The alumina utilized as a catalyst may be prepared by any suitable means. As one example, it may be precipitated from solution by treating a solution of a water-soluble form of aluminum such as aluminum nitrate with a precipitating agent such as ammonium hydroxide and then by calcining the precipitated material at high temperatures on the order of 500–800° C.

While other forms of alumina may be employed it is advantageous from the standpoint of optimum results to utilize the type of alumina commonly known as gamma alumina. Gamma alumina is characterized by definite crystallographic properties and is readily distinguished from other modifications of aluminia such as alpha aluminia and beta alumina by its X-ray diffraction pattern. Alumina catalysts are commercially available.

The present invention in its second and preferred embodiment is charcterized by the catalytic action of combinations of niobium oxide and alumina in the production of nitroolefins. The niobium oxide is typically used with a suitable catalyst support. Such supports may include alumina, silica gel and silicon carbide. It is preferred to use alumina as the support for the niobium oxide in order to obtain an intimate association of alumina and niobium oxide. The niobium oxide-containing catalyst may be prepared by any suitable means. As one example, the catalyst may be prepared by impregnating the support material with an aqueous solution containing a water-soluble form of niobium oxide, such as niobium oxalate, filtering the material to remove water and then calcining the material in air at high temperatures on the order of 500–800° C. When a support other than alumina is used, the niobium oxide catalyst is then physically mixed with alumina.

When alumina and niobium oxide comprise the catalyst of the present invention the respective materials may be present in any suitable proportion. Typically satisfactory results are obtained when the catalyst contains about 10% niobium oxide of the total catalyst on a weight basis.

The catalyst material may be in any suitable form. The catalyst may be in the form of pellets, in the form of a fine powder or other shaped pieces of suitable size of regular or irregular contour.

It has been determined that the niobium oxide-alumina catalyst retains its activity longer than the catalyst composed solely of alumina.

Since the reaction of nitrohydrocarbon and aldehyde is carried out in the vapor phase, the temperatures that are employed must be sufficient to maintain the reactants in the vapor phase but should not exceed temperatures at which substantial decomposition of the particular reactants and/or reaction products occur. Such temperatures depend principally on the particular reactants utilized. In general, temperatures below 400° C. are used.

It is an advantage of the present invention that it may be conveniently practiced at atmospheric pressures although if desired sub-atmospheric or super-atmospheric pressures may be used. A generally suitable range is from about 10 to 200 pounds per square inch.

The feed to the process may contain the nitrohydrocarbon and the aldehyde in any suitable proportion. It is convenient to use a mole ratio of nitrohydrocarbon to aldehyde of about 1:1. A broad suitable range for the mole ratio of nitrohydrocarbon to aldehyde is from about 1:10 to about 10:1.

The process is most conveniently carried out in a continuous manner, although batchwise operation may be used. For continuous operation, the components of the feed are brought into the vapor state in a suitable vaporizer and the reaction is effected by passing a gaseous mixture of the feed components through a reaction zone containing the catalyst. The reaction zone advantageously is defined by an elongated tube or tubes wherein the catalyst is positioned. A separate vaporizing means may be employed or the forepart of the heated reaction zone may serve as vaporizer for the liquid feed components.

When the process is conducted in a continuous manner the flow rate of the mixture is so adjusted that the desired conversion of nitrohydrocarbon to nitroolefin is obtained in the desired period of time. The term "flow rate" as used in the present specification and the appended claims refers to the total number of grams of reactants contacted with 1 cc. of catalyst per hour, the volume of the catalyst being measured in bulk. The optimum flow rate to be employed in any particular case depends in part on the particular catalyst and the particular reactants used as well as on the specific conditions of reaction such as temperature and pressure employed. Typically suitable flow rates generally range from about 0.1 to 20.

The nitroolefins obtained by the present procedure may be recovered by any suitable procedure. Typically the reaction product is passed from the reaction zone and is then recovered as by cooling to liquefy the product followed by distillation of the liquefied product to recover a purer nitroolefin product.

The invention will be understod more fully by reference to the following specific examples. It is understood that the examples are presented for purposes of illustration only and are not intended as a limitation of the invention.

In the following examples the reaction was carried out by passing a gaseous mixture of nitrohydrocarbon and aldehyde downward through the glass tube 18 inches long and ½ inch in diameter, the lower portion of which contained the catalyst material. The reaction tube was heated by means of an oil bath. The effluent from the reaction tube was passed through a water-cooled condenser and the condensed products were collected for analysis.

*Example 1*

A gaseous mixture of 1-nitropropane and aqueous formaldehyde in a mole ratio of 1-nitropropane to formaldehyde of 1:1 was passed through a reactor tube containing as catalyst niobium oxide supported on gamma alumina, at a temperature of approximately 190° C., at atmospheric pressure and at a flow rate of 0.9. The catalyst contained 10% by weight niobium oxide. The formaldehyde used was a commercial aqueous solution containing approximately 37% formaldehyde. The condensed effluent from the reaction tube was found to contain 2-nitro-1-butene in a yield of 73% based on 1-nitropropane.

*Example 2*

In a further example similar to that described in Example 1, 750 grams of a gaseous mixture containing 132 grams of formaldehyde, 225 grams water and 393 grams 1-nitropropane was passed during a period of five hours through a reactor tube containing as catalyst 10% niobium oxide supported on gamma alumina. The temperature of the reaction during the five-hour period ranged from 170–190° C. Atmospheric pressure was maintained during the reaction. A flow rate of 10 was employed. The product was collected at one-hour intervals and yields of 2-nitro-1-butene based on 1-nitropropane determined. The results are shown in Table 1.

*Example 3*

The procedure of Example 2 was repeated with the exception that alumina was the sole catalytic material utilized. The yields of 2-nitro-1-butene based on 1-nitropropane are shown in Table 1.

TABLE 1

| Catalyst | Percent yield during first hour | Percent yield during second hour | Percent yield during third hour | Percent yield during fourth hour | Percent yield during fifth hour |
| --- | --- | --- | --- | --- | --- |
| Niobium oxide-alumina | 55 | 65 | 65 | 57 | 52 |
| Alumina | 54 | 31 | 12 | 6 | 6 |

The data of Example 2 and Example 3 demonstrate the ability of a niobium oxide-alumina catalyst and of an alumina catalyst to each catalyze the reaction of 1-nitropropane and formaldehyde to obtain 2-nitro-1-butene. The data further demonstrate the better results obtained using the niobium-oxide-alumina catalyst in comparison with alumina alone. For instance, during the course of the experiment of Example 2 the yield of 2-nitro-1-butene remained at high levels during the entire five-hour period. In contrast, in the experiment of Example 3 the yield of 2-nitro-1-butene was at a high level during the first hour but thereafter fell off sharply.

*Example 4*

A gaseous mixture of nitroethane and aqueous formaldehyde in a mole ratio of nitroethane to formaldehyde of about 2.5:1 was passed over a two-hour period through a reactor tube containing as catalyst 10% niobium oxide supported on gamma alumina at a temperature of approximately 180° C. and at atmospheric pressure. A flow rate of 10 was employed. The product was collected hourly and analyzed to determine the yield of 2-nitro-1-propene. The results are shown in Table 2.

TABLE 2

| Catalyst | Percent yield during first hour | Percent yield during second hour |
| --- | --- | --- |
| Niobium oxide-alumina | 47 | 51 |

*Example 5*

The procedure of Example 4 is repeated in all essential details except that nitroethane is replaced by 1-nitrobutane. 2-nitro-1-pentene is obtained.

*Example 6*

The procedure of Example 4 is repeated in all essential details except that nitroethane is replaced by 1-nitropropane and formaldehyde is replaced by acetaldehyde. 3-nitro-2-pentene is obtained.

The nitroolefins which can be produced by the process of the present invention find a variety of uses. They are of value as pesticides, fungicides, resin intermediates, as special solvents and as chemical intermediates for the preparation of a wide variety of useful chemical compounds.

Since many embodiments may be made of this invention and since many changes may be made in the embodiments described the foregoing is to be interpreted as illustrative only and the invention is defined by the claims appended hereto.

I claim:
1. A process for the production of nitroolefins wherein the nitro group is positioned on the carbon atom adjacent to the point of unsaturation which comprises passing a gaseous stream comprising a primary nitrohydrocarbon and an aldehyde into contact with a catalyst comprising alumina at temperatures not in excess of those at which substantial decomposition of the said aldehyde and the said nitrohydrocarbon occurs.

2. A process for the production of nitroolefins wherein the nitro group is positioned on the carbon atom adjacent to the point of unsaturation which comprises passing a gaseous stream comprising a primary nitrohydrocarbon of the formula R—CH$_2$—NO$_2$ wherein R is selected from the group consisting of hydrogen, an arylalkyl radical, an alkyl radical containing from one up to and including twelve carbon atoms and an aryl radical and an aldehyde of the formula $$R'-\overset{\overset{\displaystyle O}{\|}}{C}H$$

wherein R' is selected from the group consisting of aryl radical, hydrogen and lower alkyl radical into contact with a catalyst comprising alumina at temperatures not in excess of those at which substantial decomposition of the said aldehyde and the said nitrohydrocarbon occurs and recovering the nitroolefin.

3. The process of claim 2 wherein the temperature is not in excess of 400° C.

4. The process of claim 3 wherein the mole ratio of nitrohydrocarbon to aldehyde ranges from about 1:10 to about 10:1.

5. The process of claim 3 wherein the pressure ranges from about 10 to about 200 pounds per square inch.

6. The process of claim 3 wherein the flow rate ranges from about 0.1 to about 20.0.

7. The process of claim 3 wherein the aldehyde is formaldehyde.

8. The process of claim 3 wherein the nitrohydrocarbon is 1-nitropropane.

9. A process for the production of nitroolefins wherein the nitro group is attached to the carbon atom adjacent to the point of unsaturation which comprises passing a gaseous stream comprising a primary nitrohydrocarbon and an aldehyde into contact with a catalyst comprising niobium oxide and alumina at temperatures not in excess of those at which substantial decomposition of the said aldehyde and the said nitrohydrocarbon occurs.

10. A process for the production of nitroolefins wherein the nitro group is position on the carbon atom adjacent to the point of unsaturation which comprises passing a gaseous stream comprising a primary nitrohydrocarbon of the formula R—CH$_2$—NO$_2$ wherein R is selected from the group consisting of hydrogen, an arylalkyl radical, aryl radical and an alkyl radical containing up to and including twelve carbon atoms and an aldehyde of the formula $$R'-\overset{\overset{\displaystyle O}{\|}}{C}-H$$

wherein R' is selected from the group consisting of aryl radical, hydrogen and lower alkyl radical into contact with a catalyst comprising niobium oxide and alumina at temperatures not in excess of those at which substantial decomposition of the said aldehyde and the said nitrohydrocarbon occurs and recovering the nitroolefin.

11. The process of claim 10 wherein the temperature is not in excess of 400° C.

12. The process of claim 11 wherein the niobium oxide is supported on alumina.

13. The process of claim 11 wherein the mole ratio of nitrohydrocarbon to aldehyde ranges from about 1:10 to about 10:1.

14. The process of claim 11 wherein the pressure ranges from about 10 to about 200 pounds per square inch.

15. The process of claim 11 wherein the flow rate ranges from about 0.1 to about 20.0.

16. The process of claim 11 wherein the aldehyde is formaldehyde.

17. The process of claim 11 wherein the nitrohydrocarbon is 1-nitropropane.

18. The process of claim 11 wherein the alumina is gamma alumina.

References Cited by the Examiner

UNITED STATES PATENTS 2,383,603   8/1945   Larrison et al. _____ 260—644

OTHER REFERENCES

Fieser & Fieser, Advanced Organic Chemistry, Reinhold Publ. Corp., New York, 1961, page 395 Q.D. 251 F5a.

LEON D. ROSDOL, *Primary Examiner.*

CARL D. QUARFORTH, REUBEN EPSTEIN,
*Examiners.*

L. A. SEBASTIAN, *Assistant Examiner.*